June 1, 1954 — Q. A. KERNS — 2,680,227
POLAROSCOPE
Filed June 19, 1947 — 9 Sheets-Sheet 1

INVENTOR
QUENTIN A. KERNS
BY
ATTORNEY

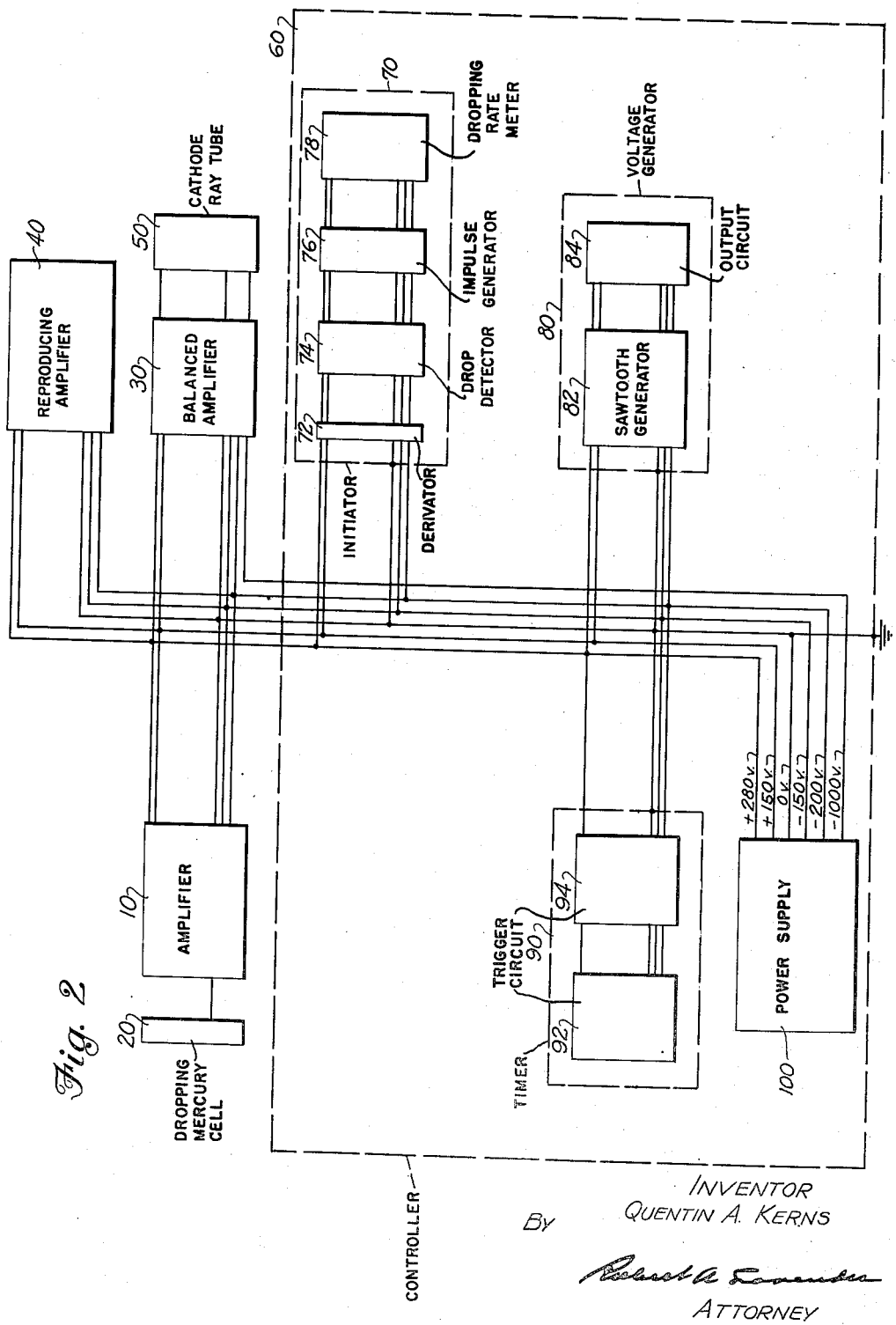

June 1, 1954

Q. A. KERNS 2,680,227

POLAROSCOPE

Filed June 19, 1947

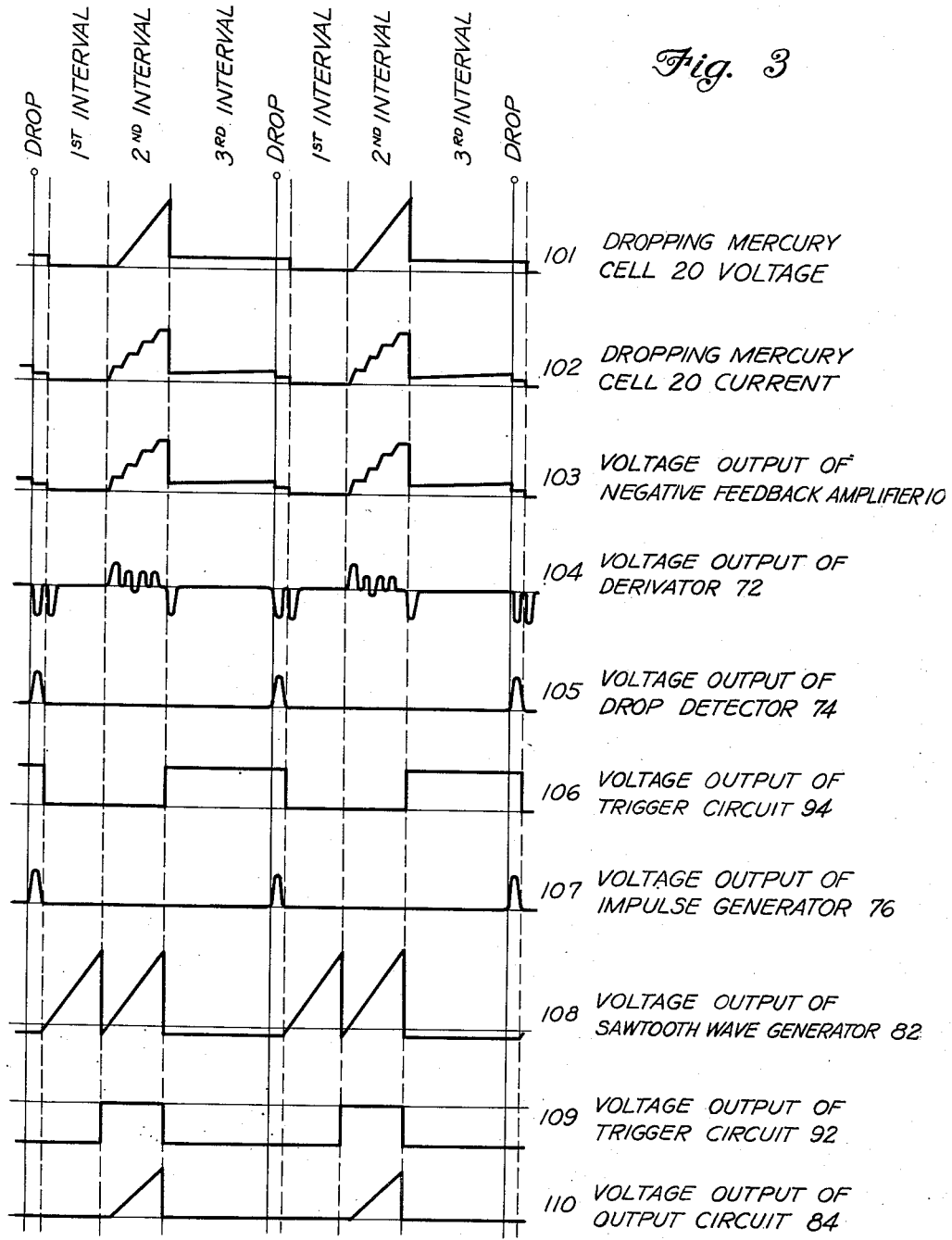

Fig. 3

101 DROPPING MERCURY CELL 20 VOLTAGE

102 DROPPING MERCURY CELL 20 CURRENT

103 VOLTAGE OUTPUT OF NEGATIVE FEEDBACK AMPLIFIER 10

104 VOLTAGE OUTPUT OF DERIVATOR 72

105 VOLTAGE OUTPUT OF DROP DETECTOR 74

106 VOLTAGE OUTPUT OF TRIGGER CIRCUIT 94

107 VOLTAGE OUTPUT OF IMPULSE GENERATOR 76

108 VOLTAGE OUTPUT OF SAWTOOTH WAVE GENERATOR 82

109 VOLTAGE OUTPUT OF TRIGGER CIRCUIT 92

110 VOLTAGE OUTPUT OF OUTPUT CIRCUIT 84

INVENTOR
QUENTIN A. KERNS

By

ATTORNEY

June 1, 1954

Q. A. KERNS
POLAROSCOPE 2,680,227

Filed June 19, 1947

INVENTOR
QUENTIN A. KERNS

BY

ATTORNEY

INVENTOR
QUENTIN A. KERNS
BY
ATTORNEY

June 1, 1954

Q. A. KERNS 2,680,227

POLAROSCOPE

Filed June 19, 1947

INVENTOR
QUENTIN A. KERNS

By

*Robert A. Lounsbury*

ATTORNEY

Patented June 1, 1954

2,680,227

UNITED STATES PATENT OFFICE 2,680,227

POLAROSCOPE

Quentin A. Kerns, Berkeley, Calif., assignor to the United States of America as represented by the United States Atomic Energy Commission Application June 19, 1947, Serial No. 755,794

2 Claims. (Cl. 324—31)

This invention relates to a polaroscope and more particularly to an apparatus for the electro-chemical analysis of liquid solutions.

In polarographic analyses of liquid electrolytes as developed to determined the reducible components in the electrolytes, use is made of an electrolytic cell having a dropping mercury capillary tube as one electrode and a mercury pool as the other electrode, both electrodes being immersed within the electrolyte to be analyzed.

To analyze the electrolyte a varying voltage is applied between the two electrodes of the cell and a study made of the resulting current-voltage relation. This study reveals a stepped current variation with respect to voltage changes; the voltage at which each current step occurs is the characteristic deposition voltage for a particular reducible component of the electrolyte and the height of each current step is proportional to the quantity of that particular reducible component. In practice the current-voltage relation is recorded on a moving graph and such a graph is known as a polarogram. Further, a method has been devised whereby the current voltage relation is portrayed on an oscilloscope; however, the apparatus involved is quite simple and does not include a controller circuit for automatically and correctly applying the varying voltage at predetermined intervals during the formation of the mercury drops.

In order to obtain a more rapid visual analysis it is proposed by this invention to record the current-voltage characteristic curve instantaneously on the screen of a cathode ray tube. In order that the curves so obtained are accurate and consistent, it is necessary that a periodically varying voltage of sawtooth wave form be applied to the dropping mercury cell at a predetermined time during the formation of a mercury drop. That is, it is desirable that the varying voltage be applied when the drop has almost reached its maximum size, when its rate of growth is relatively small, when its size is substantially the same as previous drops, and just prior to the drop breaking off and falling from the tip of the capillary tube electrode. To initiate the generation of this varying voltage of sawtooth wave form and to apply it at the proper interval in the development of a mercury drop, a rather complex control circuit has been devised. This control circuit or controller, as it is known, provides the necessary timing for a complete cycle of operation which occurs in the period between the instants of breaking off of successive mercury drops, namely:

1. The first interval commences when a drop falls from the tip of the capillary electrode and a new drop begins to form. This interval ends when a sawtooth wave of voltage begins to appear between the electrodes of the dropping mercury cell.

2. The second interval commences simultaneously with the start of the sawtooth wave of voltage between the electrodes of the dropping mercury cell and ends at the time this sawtooth wave of voltage returns to minimum value after reaching its maximum value.

3. The third interval commences when said sawtooth wave of voltage returns to minimum value and ends when the drop falls from the tip of the capillary electrode and another drop begins to form, thus completing the cycle of operation.

To obtain the current-voltage curve on the screen of the cathode ray tube, three amplifiers are employed. The principal amplifier is of the negative feedback type having a large feedback resistance and a high value of round trip transmission coefficient. The varying voltage of sawtooth waveform is applied to this negative feedback amplifier and to the dropping mercury cell which is connected to the feedback network between the amplifier input and ground. With such an arrangement, the voltage across the cell is proportional to and can be made almost equal to the amplifier input voltage and the voltage drop in the feedback resistance is proportional to the cell current. Through the medium of the negative feedback circuit, even though the effective resistance of the cell varies with the voltage across the cell, the sawtooth voltage wave of the desired magnitude and form is always impressed on the cell and a voltage drop proportional to the cell current is obtained across the feedback resistance. The varying voltage of sawtooth waveform applied to the negative feedback amplifier as described is also applied to the input of a conventional oscilloscope type amplifier, the output of which is connected to the horizontal deflecting plates of the cathode ray tube. The vertical deflecting plates of said cathode ray tube are supplied with a voltage obtained from another oscilloscope type amplifier having its input circuit connected to the feedback amplifier output so that the voltage thus impressed across said vertical deflecting plates is proportional to the cell current.

It is therefore an object of this invention to provide a new and improved apparatus for electrochemical analysis of electrolytic solutions.

A further object of this invention is to provide a new and improved apparatus for electrochemical analysis of electrolytic solutions which automatically produces a visual polarogram during a predetermined fraction of the interval between birth of a new mercury drop and of the breaking off of said drop at the tip of a capillary electrode.

Another object of this invention is to provide a new and improved apparatus for electrochemical analysis of electrolytic solutions which automatically produces a linearly varying voltage across an electrolytic solution at a predetermined time during the formation of a mercury drop so that said linearly varying voltage is applied at the same instant for each drop to eliminate errors due to changes in mercury drop size for successive polarograms.

Still another object of this invention is to provide a new and improved apparatus for electrochemical analysis of electrolytic solutions which automatically produces a voltage of rectangular wave form simultaneous with the generation of a linearly varying voltage, which deflects the electron stream of the cathode ray tube away from the screen except during the interval when said linearly varying voltage is applied to the electrolytic solutions, thereby preventing spurious traces on the screen of said cathode ray tube.

A still further object is to provide a new and improved apparatus for electrochemical analysis of electrolytic solutions which automatically produces a voltage proportional to the current which flows through an electrolytic solution when a linearly varying voltage is impressed across said electrolytic solution so that said proportional voltage can be utilized in the visual analysis of said electrolytic solution on the screen of a cathode ray tube.

Other objects and advantages of the invention will be apparent in the following description and claims considered together with the accompanying drawing in which:

Fig. 2 is a schematic block diagram of the polaroscope showing interconnections of direct current operating voltages between the power supply and the other components;

Fig. 3 is a series of time correlated graphs showing the subsequence of wave forms involved in the operations occurring in various parts of the polaroscope circuit;

Figure 1:
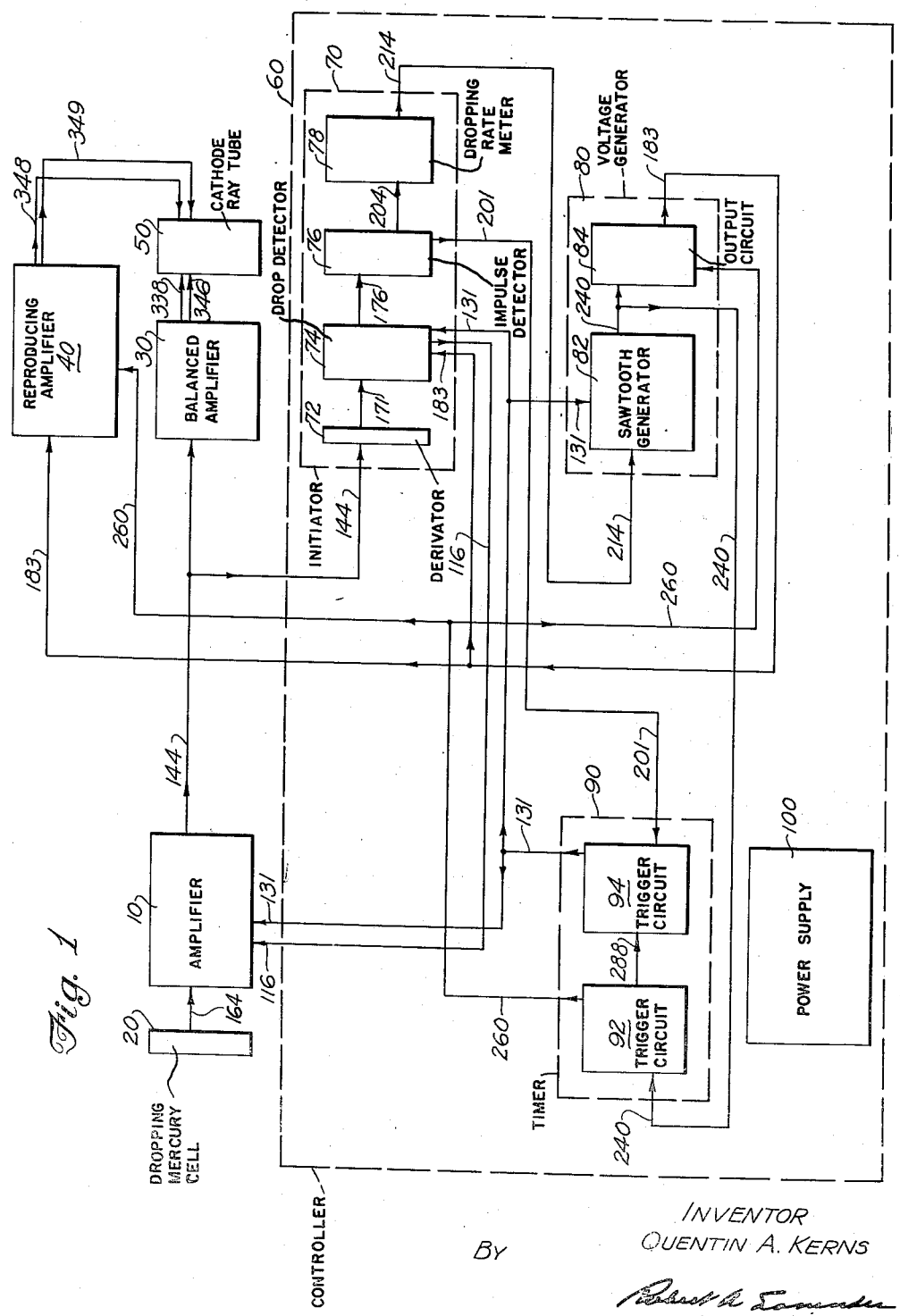
Figure 1 is a schematic block diagram of the polaroscope showing the interconnections of signal voltages between the components.

Now referring to the drawings in detail, and in particular to Fig. 1, the polaroscope comprises a negative feedback amplifier component 10, a dropping mercury cell component 20, a balanced amplifier component 30, a reproducing amplifier component 40, a cathode ray tube component 50, and a controller component 60. Said controller component 60 has several sub-components, namely: an initiator 70 comprising a derivator circuit 72, a drop detector circuit 74, an impulse generator circuit 76, and a dropping rate meter circuit 78; a voltage generator 80 comprising a sawtooth generator circuit 82 and an output circuit 84; a timer 90 comprising a trigger circuit 92 and a trigger circuit 94; and a power supply 100. The interconnections between the components and circuits will be explained in detail hereinafter in the description of the other figures of the polaroscope.

Fig. 2 represents the distribution of direct current static operating voltages between the power supply 100 and the other components and circuits of the polaroscope. The power supply 100 is a conventional rectifier type, with an alternating current input, to supply static operating voltages of $-1000$, $-200$, $-150$, $+150$ and $+280$ volts plus a common lead at ground potential for the vacuum tubes in the polaroscope circuit.

Fig. 3 represents a series of time correlated graphs showing the subsequence of current and voltage waveforms during the intervals of operation of the polaroscope. A sawtooth waveform 101 is the form of the voltage impressed across the dropping mercury cell 20. A stepped waveform 102 is the form of the current flowing through the dropping mercury cell 20 during the time that the voltage of waveform 101 is impressed across said dropping mercury cell 20. A waveform 103, similar to the waveform 102, is the voltage output of the negative feedback amplifier 10. The waveform 104 is the waveshape of the voltage output of the derivator 72. The pulse waveform 105 is the waveshape of the voltage output of the drop detector 74. The rectangular waveform 106 is the form of the output voltage of the trigger circuit 94. The pulse waveshape 107 is similar to the voltage waveshape 105 of the drop detector 74 and is the waveshape of the output voltage of the impulse generator 76. The sawtooth waveform 108 is the waveshape of the output voltage of the sawtooth generator 82. The rectangular waveform 109 is the waveshape of the output voltage of the trigger circuit 92. The sawtooth waveform 110 is the waveshape of the output voltage of the output circuit 84. Further reference will be made to said current and voltage waveforms hereinafter in the description of the other figures of the polaroscope.

Figure 4:
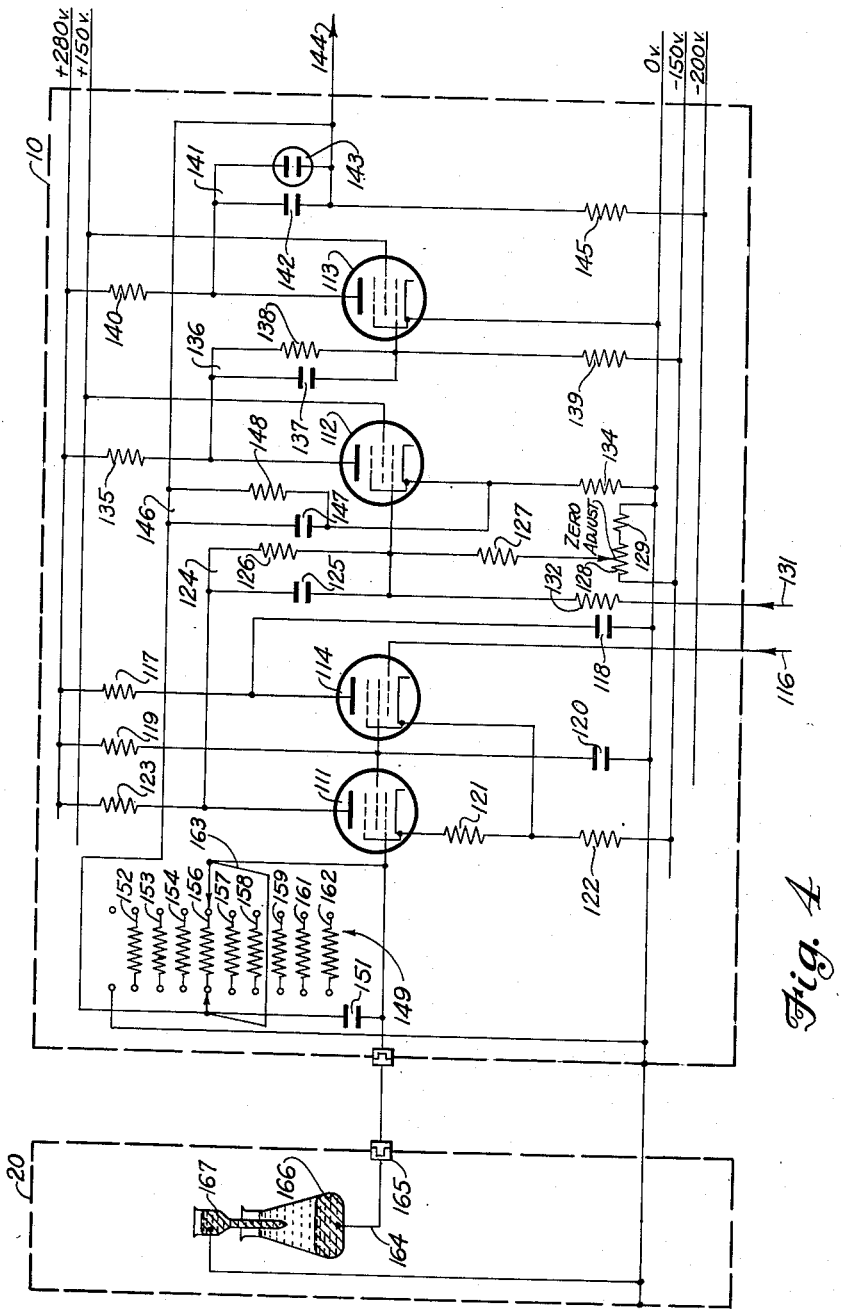
Fig. 4 is a schematic wiring diagram of the negative feedback amplifier and the dropping mercury cell components of the polaroscope.

In Fig. 4 a negative feedback amplifier 10 comprising three pentode vacuum tubes, 111, 112 and 113, which give three stages of amplification, and a pentode tube 114 which acts as a coupling tube is shown. An input lead 116 is connected to the control grid of said coupling tube 114 and supplies a voltage of waveform 101 as shown on Fig. 3. Other connections of said tube 114 are as follows: the plate is connected to the +280 volt direct current source through a dropping resistor 117 and to ground through a by-pass condenser 118; the screen grid is connected to the screen grid of the pentode 111, to the +280 volt direct current source through a dropping resistor 119, and to ground through a by-pass condenser 120; the cathode is connected to the cathode of said tube 111 through a cathode bias resistor 121 and to the $-150$ volt direct current source through a dropping resistor 122. The plate of said pentode tube 111 is connected to the +280 volt direct current source through a dropping resistor 123 and further to the control grid of the second amplifying pentode tube 112 through a coupling network 124 comprising a capacitor 125 connected in parallel with a resistor 126. Further connections of said tube 112 are as follows: the control grid is connected to a voltage divider through a dropping resistor 127 by means of the adjustable arm of a potentiometer 128 which combined with a resistor 129 forms a source of variable biasing voltage, serving as the zero adjustment for the circuit between ground and the −150 volt direct current source, and further to a lead 131, through a resistor 132, which supplies a voltage of rectangular waveform 106 as shown on Fig. 3; the screen grid is connected to the +150 volt direct current source; the cathode is connected to ground through a biasing resistor 134; the plate is connected to the +280 volt direct current source through a dropping resistor 135, and further to the control grid of the third pentode amplifier tube 113 through a coupling network 136 comprising a condenser 137 connected in parallel with a resistor 138. Further connections of said tube 113 are as follows: the control grid is connected to the −150 volt direct current source through a dropping resistor 139; the cathode is connected to ground; the screen grid is connected to the +150 volt direct current source; the plate is connected to the +280 volt direct current source through a dropping resistor 140, and further to a coupling network 141 comprising a condenser 142 connected in parallel with a neon bulb 143. Said coupling network 141 is connected to an output lead 144 which furnishes a voltage of waveform 103 as shown on Fig. 3 to other components of the polaroscope, and further to a dropping resistor 145 which is connected to the −200 volt direct current source. The voltage at said output lead 144 is impressed on the cathode of said tube 112 through a coupling network 146 comprising a condenser 147 connected in parallel with a resistor 148, and on the control grid of said tube 111 through a variable coupling network 149 comprising a condenser 151 connected in parallel with one of several resistors 152, 153, 154, 156, 157, 158, 159, 161 or 162 as selected by switch 163. Said coupling network 149 is connected to a lead 164 which is connected through a plug 165 to the mercury pool 166 of the dropping mercury cell 20. The mercury reservoir of the capillary electrode 167 of said cell 20 is connected to ground.

With the elements and interconnections as described in the preceding paragraph, said Fig. 4 represents a negative feedback amplifier 10 circuit with a dropping mercury cell 20 connected across the feedback voltage. The coupling tube 114 is included in the first of three stages of amplification to facilitate the application of a voltage of sawtooth waveform to said amplifier 10 with the least amount of distortion and unbalance. It is further necessary that said coupling tube 114 and the pentode amplifier tube 111 of the first stage of amplification be of the same type and have a common screen grid voltage supply circuit. A by-pass condenser 118 is connected between the plate of said coupling tube 114 and ground so that voltage variations at said plate are grounded and do not affect the tube operation. Therefore, during the second interval of operation when a positive sawtooth wave of voltage is applied at the control grid of the coupling tube 114, the current flowing through said tube 114 increases, thereby causing an in-phase voltage change of the same waveform to appear across resistor 122 in the cathode circuit. Now, since said resistor 122 is also connected in the cathode circuit of the first amplifying tube 111, the potential at this cathode increases causing a decrease in the current flowing, thereby resulting in a positive sawtooth voltage change at the plate.

Said positive sawtooth voltage change at the plate of said tube 111 is transferred to the control grid of the second pentode amplifier tube 112 through the coupling network 124 which has a low impedance for the varying voltage. The normal control grid bias for said tube 112 may be adjusted by the potentiometer 128. Thus, the voltage at the control grid of said tube 112 increases causing the current flowing through the tube to increase, thereby decreasing the plate voltage in a similar manner, so that there is a sawtooth voltage change of opposite polarity at said plate. There is also present in this second stage of amplification a small amount of degenerative action because of the self-biasing cathode resistor 134; that is, as the current through the tube 112 increases, the voltage across said resistor 134 increases and tends to raise the potential at the cathode, thereby opposing by a small amount the tube action due to the voltage applied at the control grid.

Said sawtooth voltage change of opposite polarity at the plate of said tube 112 is impressed on the control grid of the third pentode amplifier tube 113 through the low impedance coupling network 136 and across the resistor 139 and causes the current flow through the tube to decrease thus increasing the plate voltage so that a positive sawtooth wave of voltage is present at the plate.

The output voltage of the amplifier 10 is taken from the plate of said tube 113 by the lead 144 through the coupling network 141. A portion of the output voltage is fed back to the second amplifier stage through the coupling network 146 and is applied across the resistor 134 in the cathode circuit of the tube 112. Since said output voltage is a positive sawtooth wave of voltage, the potential at the cathode rises and causes a decrease of the current flowing in the tube, thus opposing the tube action in response to the signal applied at the control grid.

Also, a portion of said output voltage is fed back to the control grid of the tube 111 of the first amplifier stage through a coupling network 149. Said coupling network 149 comprises the condenser 151, the plurality of resistors 152, 153, 154, 156, 157, 158, 159, 161 and 162, and the selector switch 163; thus by using said selector switch the impedance of this coupling network may be changed according to the value of resistance selected, thereby manually controlling the amount of voltage which is fed back to the first stage of amplification. Since the overall gain of a feedback amplifier system such as has been outlined above is proportional to the amount of voltage which is actually fed back from the output to the input, the overall gain of the amplifier 10 may be manually controlled by changing the position of said selector switch 163.

With the dropping mercury cell 20, in position as shown on said Fig. 4, that is, connected between the control grid of the first amplifier stage tube 111 and ground, the feedback voltage appears across said cell 20 and at all times during the second interval of operation the voltage is of sawtooth waveform.

During the third interval of operation of the polaroscope a positive voltage of rectangular waveform 106 as shown on Fig. 3 is impressed on the control grid of the second amplifier tube 112. Said positive rectangular wave of voltage is amplified in the second and third stages of amplification and is negatively fed back in the same manner as the sawtooth wave of voltage during the second interval of operation as described above. In the first interval there are no voltages applied to the negative feedback amplifier 10 so that said amplifier 10 is in a quiescent state. Therefore, the voltage across the dropping mercury cell during one cycle of operation of the polaroscope is of the waveshape 101 as shown on Fig. 3.

In the second interval of the cycle of operation a sawtooth wave of voltage is impressed across the dropping mercury cell 20 as a new mercury drop is forming on the tip of the dropping mercury electrode 167. The resistance of the electrolyte between the dropping mercury electrode 167 and the mercury pool 166 decreases each time the deposition voltage of a reducible component in said electrolyte is reached causing a stepped current of waveform 102 as shown on Fig. 3. Because of the resistance in the coupling network 149 of the feedback circuit the voltage applied across the dropping mercury cell 20 remains in the form of waveshape 101 as shown on Fig. 3 and the voltage across said resistance in the coupling network 149 will be proportional to the current flowing in said cell 20 and in the form of waveshape 103 as shown on Fig. 3. Therefore, the changes in the feedback voltage caused by changes in the resistance of the dropping mercury cell 20 are amplified through the three amplifier stages of the negative feedback amplifier so that the output voltage is proportional to the sum of the input voltage and the voltage drop across the resistance in the feedback coupling network 149 and is of the form of waveshape 103 as shown on Fig. 3.

Since during the third interval of operation a positive voltage of rectangular waveform 106 is applied to the second amplifier stage, this voltage also is applied across the dropping mercury cell 20. At the time the drop falls from the tip of the dropping mercury electrode, the resistance of the cell 20 increases by a large amount causing the effective gain of the negative feedback amplifier to decrease and thus causing the voltage appearing at the output to decrease.

Figure 5:
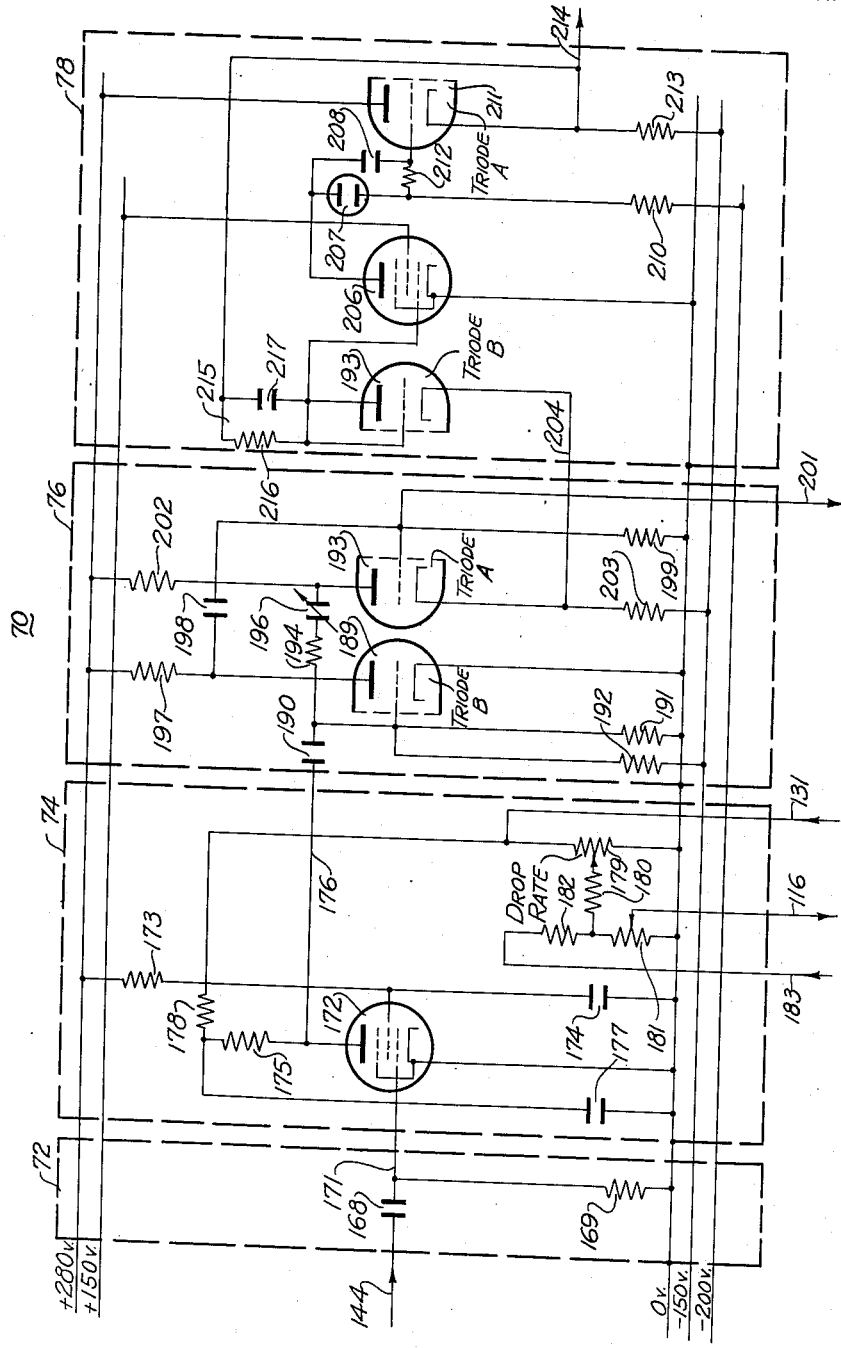
Fig. 5 is a schematic wiring diagram of the initiator component comprising a derivator circuit, a drop detector circuit, an impulse generator circuit, and a dropping rate meter circuit.

Now considering Fig. 5, lead 144 furnishes a voltage of waveform 103 as shown on Fig. 3 to the derivator circuit 72 of the initiator component 70 and is connected to a condenser 168 which is connected to ground through a resistor 169 and to a lead 171.

Said lead 171 is connected to the control grid of a pentode tube 172 and furnishes a voltage input of waveform 104 to the drop detector circuit 74. Other connections of said tube 172 are as follows: the cathode is grounded, the screen grid is connected to the +280 volt direct current source through a dropping resistor 173 and to ground through a by-pass condenser 174, and the plate is connected to a resistor 175 and to a lead 176. Said resistor 175 is connected to ground through a by-pass condenser 177 and to a resistor 178. Said resistor 178 is connected to the lead 131 which supplies a voltage of waveform 106 as shown on Fig. 3, and to a potentiometer 179 which is connected to ground and serves as a drop rate adjustment. The adjustable arm of said potentiometer 179 is connected to a resistor 180 which is connected to a potentiometer 181 which may be adjusted to control the value of the sawtooth waveform 110. Said potentiometer 181 is connected to ground and its adjustable arm is connected to the lead 116 which supplies a voltage of waveform 101 as shown on Fig. 3 to the negative feedback amplifier 10. A resistor 182 is connected to a lead 183 which supplies a voltage of waveform 110 as shown on Fig. 3 across said resistor 182 and potentiometer 181.

Said lead 176 couples a voltage of waveform 105 as shown on Fig. 3, from the plate of said tube 172 to the control grid of triode B of a double triode tube 189 through a coupling condenser 190 in the impulse generator circuit 76. Other connections of said triode B of the tube 189 are as follows: the cathode is connected to ground; the control grid is connected to a dropping resistor 191 which is connected to ground, to a resistor 192 which is connected to the −150 volt direct current source, and further to the plate of triode A of a double triode 193 through a coupling network comprising a resistor 194 in series with a variable condenser 196; the plate is connected to the +280 volt direct current source through a dropping resistor 197, and to the control grid of said triode A of tube 193 through a coupling condenser 198. Further connections of said triode A of tube 193 are as follows: the control grid is connected to ground through a grid biasing resistor 199 and to a lead 201 which furnishes a negative pulse at the start of the first interval of operation to other components of the polaroscope, the plate is connected to the +280 volt direct current source through a dropping resistor 202, and the cathode is connected to the −150 volt direct current source through a dropping resistor 203, and to a lead 204.

Said lead 204 is connected to the cathode of section B of said tube 193 and furnishes a voltage of waveform 107 as shown on Fig. 3 to the dropping rate meter 78. The control grid and plate of said section B of the double triode tube 193 are connected together and further connected to the control grid of a pentode tube 206. Other connections of said tube 206 are as follows: the cathode is connected to ground, the screen grid is connected to the +150 volt direct current source, and the plate is connected to a neon bulb 207 and a condenser 208. Said lamp 207 is further connected to the −200 volt direct current source through a dropping resistor 210 and to the control grid of triode A of a double triode tube 211 through a resistor 212. Said condenser 208 is also connected to the control grid of triode A of said tube 211. Other connections of triode A of said tube 211 are as follows: the plate is connected to the +280 volt direct current source and the cathode is connected to the −150 volt direct current source through a biasing resistor 213 and further to a lead 214. Said lead 214 is connected to the control grid of said pentode tube 206 through a coupling network 215 comprising a resistor 216 connected in parallel with a condenser 217.

Consider now the operation of the initiator 70 circuits which are described above. The derivator is a simple condenser-resistor type of circuit and operates to provide an output voltage which is proportional to the rate of change of the input voltage. Since the lead 144 applies a voltage of waveform 103 to said derivator 72, the output voltage is a series of pulses and has a waveform 104 as shown on Fig. 3.

The output voltage of the derivator 72 is impressed on the control grid of a pentode amplifier tube 172 in the drop detector 74 circuit. The lead 131 applies a positive voltage of rectangular waveform 106 as shown on Fig. 3, the value of which is adjustable by the potentiometer 179 to the plate of said tube 172 so that the tube will pass voltages appearing at the control grid only during the third interval of operation. Thus, the output voltage of the drop detector is a positive pulse occurring as the third interval terminates.

Said positive pulse of voltage appearing at the plate of tube 172 in the drop detector 74 circuit is applied to the control grid of triode B of the double triode tube 189 in the impulse generator 76 which comprises said triode B of the tube 189 and the triode A of the double triode tube 193 interconnected in the form of a conventional self-restoring trigger circuit. Said triode B of the tube 189 is normally biased to cut-off by the negative biasing voltage while triode A of said tube 193 normally is conducting since the control grid is at ground potential. The positive pulse impressed at the control grid of said triode B of the tube 189 causes current to flow in the tube and this current causes a voltage to be developed across the plate dropping resistor 197 which decreases the voltage at said plate. This decrease in plate voltage of triode B of said tube 189 is coupled to the control grid of triode A of the tube 193 through the condenser 198 so that the latter tube is cut-off causing the plate voltage to increase and the cathode voltage to decrease. The increase of plate voltage of triode A of said tube 193 is coupled to the control grid of triode B of said tube 189 through the variable condenser 196 and resistor 194. Said variable condenser 196 may be adjusted so that the time constant of the condenser 196 and the resistors 194 and 191 of the discharge path of said condenser 196 is a small value so the output voltage of the impulse generator 76 circuit will follow the input pulse of voltage. This entire action is instantaneous and the two referenced tubes return to the normal state as soon as the positive pulse of voltage on the control grid of triode B of said tube 189 has fallen to zero value. Negative pulses of voltage at the control grid of triode A of said tube 193 are connected to another circuit of the controller 60 by the lead 201. Negative pulses of voltage at the cathode of triode A of said tube 193 are applied to the dropping rate meter by means of the lead 204. Thus the impulse generator 76 produces successive negative pulses of constant magnitude at a rate equal to the dropping rate of the mercury drops in the dropping mercury cell 20.

Said lead 204 impresses the negative pulse output voltage of waveform 107, as shown on Fig. 3, of the impulse generator 76 circuit on the cathode of triode B of the double triode tube 193 in the dropping rate meter 78 circuit. Since said triode B of the tube 193 is connected so that the plate and control grid are tied together, the tube functions as a diode tube and passes signal voltages only when such signal voltages are negative. The pentode tube 206 and the triode A of the double triode tube 211 form two stages of a negative feedback amplifier circuit with a coupling network 215 for connecting the output voltage in the cathode circuit of said triode A of the tube 211 to the control grid of said pentode tube 206. The negative pulse of voltage which is impressed on the cathode of said triode B of the tube 193 causes this tube to conduct, since the cathode becomes more negative than the anode, and the current flow produces a voltage proportional to the dropping rate across said coupling network 215. The voltage across said coupling network 215 is amplified through the two amplifier stages comprising the pentode tube 206 and triode A of the double triode tube 211 and finally fed back negatively through said coupling network 215 to the control grid of said pentode tube 206. The circuit elements are of such values that the apparent input impedance of the amplifier circuit comprises a resistance reduced in value by the amplification factor and a capacitance increased in value by the amplification factor connected in parallel having the same time constant as the resistor 216 and the condenser 217 of the coupling network 215. In effect, a resistance-capacitance network of very low impedance is connected between the amplifier input and ground so that the voltage produced thereacross is at all times sufficiently low to permit transmission of uniform pulses to the coupling network 215 regardless of the dropping rate, thus achieving proportionality of the output voltage of the dropping rate meter 78 and the input pulse rate. The lead 214 which is connected to the cathode of triode A of said tube 211 couples the voltage developed across the cathode resistor 213 to the voltage generator 80.

Figure 6:
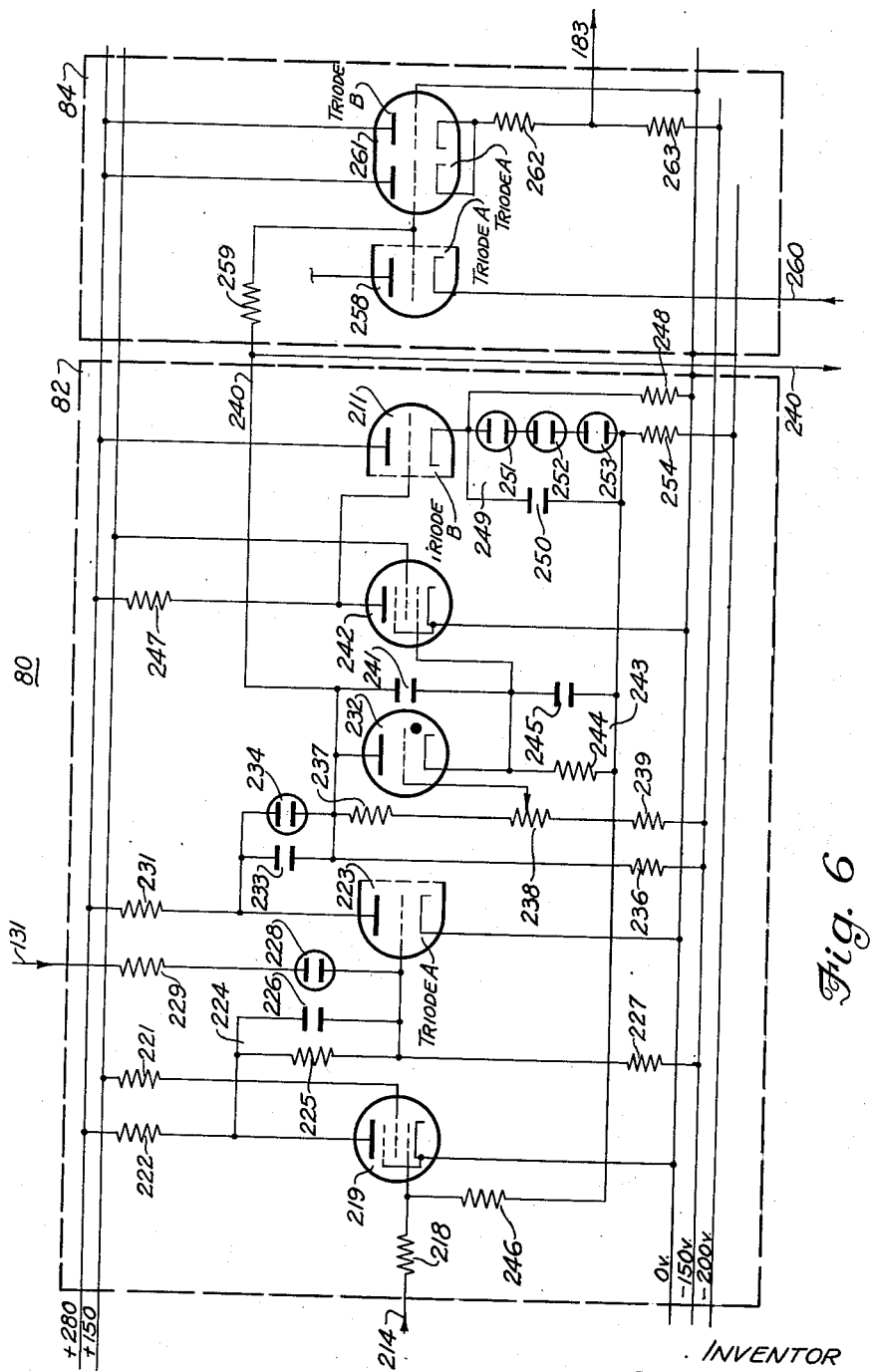
Fig. 6 is a schematic wiring diagram of the voltage generator component comprising a sawtooth wave generator circuit and an output circuit.

In Fig. 6 said lead 214 supplies a positive pulse of voltage during the first interval of operation to a resistor 218 in the sawtooth wave generator circuit 82 of the voltage generator 80. Said resistor 218 is connected to the control grid of a pentode tube 219. Further connections of said tube 219 are as follows: the cathode is connected to ground; the screen grid is connected to the +150 volt direct current source through a dropping resistor 221; the plate is connected to the +280 volt direct current source through a dropping resistor 222 and to the control grid of triode A of a double triode tube 223 through a coupling network 224 comprising a resistor 225 connected in parallel with a condenser 226. Other connections of triode A of said tube 223 are as follows: the control grid is connected to the −150 volt direct current source through a dropping resistor 227 and to the lead 131 through a neon bulb 228 and a resistor 229 to impress on said control grid a voltage of waveform 106 as shown on Fig. 3, the cathode is connected to ground, and the plate is connected to the +280 volt direct current source through a dropping resistor 231 and to the plate of a thyratron tube 232 through a coupling network comprising a condenser 233 connected in parallel with a neon bulb 234. Further connections of said thyratron tube 232 are as follows: the plate is connected to the −150 volt direct current course through a dropping resistor 236, to a voltage divider, comprising a resistor 237, a potentiometer 238, and a resistor 239 in series, which is connected to the −150 volt direct current source, to a lead 240, and to a condenser 241; the control grid is connected to the adjustable arm of potentiometer 238 of said voltage divider; the cathode is connected to said condenser 241, to the control grid of a pentode tube 242, and to the control grid of said tube 219 through a coupling network 243, comprising a resistor 244 connected in parallel with a condenser 245, in series with a resistor 246. Other connections of said pentode tube 242 are as follows: the cathode is connected to ground, the screen grid is connected to the +150 volt direct current source, and the plate is connected to the +280 volt direct current source through a dropping resistor 247 and to the control grid of triode B of said tube 211. Further connections of triode B of said tube 211 are as follows: the plate is connected to the +280 volt D. C. operating voltage, and the cathode is connected to ground through a biasing resistor 248 and to a coupling network 249 comprising a condenser 250 connected in parallel with three series connected neon bulbs, 251, 252 and 253. Said coupling network 249 is connected to the −200 volt direct current source through a dropping resistor 254 and to said coupling network 243.

The input lead 240 furnishes a voltage of waveform 108 to the control grid of triode A of a double triode tube 258 in the output circuit 84 through a resistor 259. The plate of triode A of said tube 258 has no connections, and the cathode of this tube is connected to a lead 260 which supplies a voltage of waveform 109 as shown on Fig. 3. The control grid of triode A of said tube 258 is connected to the control grid of triode A of a double triode tube 261. Other connections of triode A of said tube 261 include a connection from the plate to the +280 volt direct current source and a connection from the cathode to the cathode of triode B of said tube 261. Further connections of triode B of said tube 261 include: a connection of the plate to the +280 volt direct current source, a connection of the control grid to ground, and a connection of the cathode to the −150 volt direct current source through two biasing resistors 262 and 263. Said resistor 262 is also connected to a lead 183 which serves as the output of the voltage generator 80 and supplies a voltage of waveform 110 as shown on Fig. 3 to other sections of the polaroscope circuit.

In the sawtooth wave generator 82, as described above, the lead 214 impresses a voltage proportional to the dropping rate on the control grid of the pentode amplifier tube 219 which serves as the first stage of amplification in a four stage negative feedback amplifier. The first and second stages of amplification, comprising said tube 219 and triode A of the double triode tube 223 respectively, are conventional and amplify the input voltage signals. The output voltage of the second amplifier stage is obtained from the plate of triode A of said tube 223 and is coupled through the condenser 241 to the control grid of the third stage of amplification comprising the pentode tube 242. The thyratron tube 232 is connected in parallel with said condenser 241 in such a manner that the tube is normally cut-off and conducts only when the voltage across said condenser 241 reaches the conduction voltage of the tube. The third stage of amplification is coupled in a conventional manner to the fourth stage which comprises the triode B of the tube 211 connected to operate as a cathode follower type of amplifier. The output voltage of said fourth stage of amplification is obtained across the cathode resistor 254 of triode B of said tube 211 and this voltage being of opposite phase with reference to the input voltage is fed back to the control grid of the first amplifier tube 219 to oppose the input voltage. The values of the elements in the circuit are such that the output voltage of the four stages of amplification is proportional to the input voltage and therefore proportional to the dropping rate. Thus, during the first interval of operation said condenser 241 charges at a rate proportional to the dropping rate until the voltage across the condenser 241 reaches the conduction voltage of said thyratron tube 232, at which time the tube 232 conducts and rapidly discharges said condenser 241 so that the voltage produced has a sawtooth waveform. This action is repeated during the second interval of operation and another voltage of sawtooth waveform is produced. In the third period of operation a positive voltage of rectangular waveform 106 as shown on Fig. 3 is impressed on the control grid of triode A of the tube 223 of the second amplifier stage and this voltage acts in opposition to the signal voltage transmitted from the plate of the first amplifier tube 219 so that the resulting voltage at the condenser 241 is slightly negative to prevent the condenser from charging positively and the thyratron tube from conducting. Thus, a voltage of waveform 108 as shown on Fig. 3 is developed across said condenser 241 during the three intervals of operations and is transmitted to other parts of the polaroscope circuit by the lead 240.

Said lead 240 is connected into the output circuit and supplies a voltage as related above to the resistor 259. Since said resistor is connected to the control grid of triode A of the double triode tube 258, the voltage applied is of the waveform 108 as shown on Fig. 3. The plate of said triode A of the tube 258 is left disconnected while the cathode is connected to the lead 260 which applies a negative voltage of rectangular waveform 109 as shown on Fig. 3. Thus, during the first and third intervals, any positive voltages appearing at the control grid of triode A of said tube 258 are grounded through the tube as the cathode is much more negative than the control grid by virtue of the negative potential applied. However, in the second period the voltage impressed on the cathode of said triode A of the tube 258 rises to ground potential so that this tube will not conduct and a voltage of sawtooth waveform is impressed on the control grid of triode A of the tube 261. Triode A and triode B of said tube 261 are connected as a cathode follower so that the positive voltage of sawtooth waveform impressed on the control grid of said triode A during the second interval is reproduced with the same phase relationship across the cathode resistor 263. The lead 183 is connected in such a manner that the voltage across said resistor 263 having a waveform 110 as shown on Fig. 3 is transmitted to other sections of the polaroscope circuit.

Figure 7:
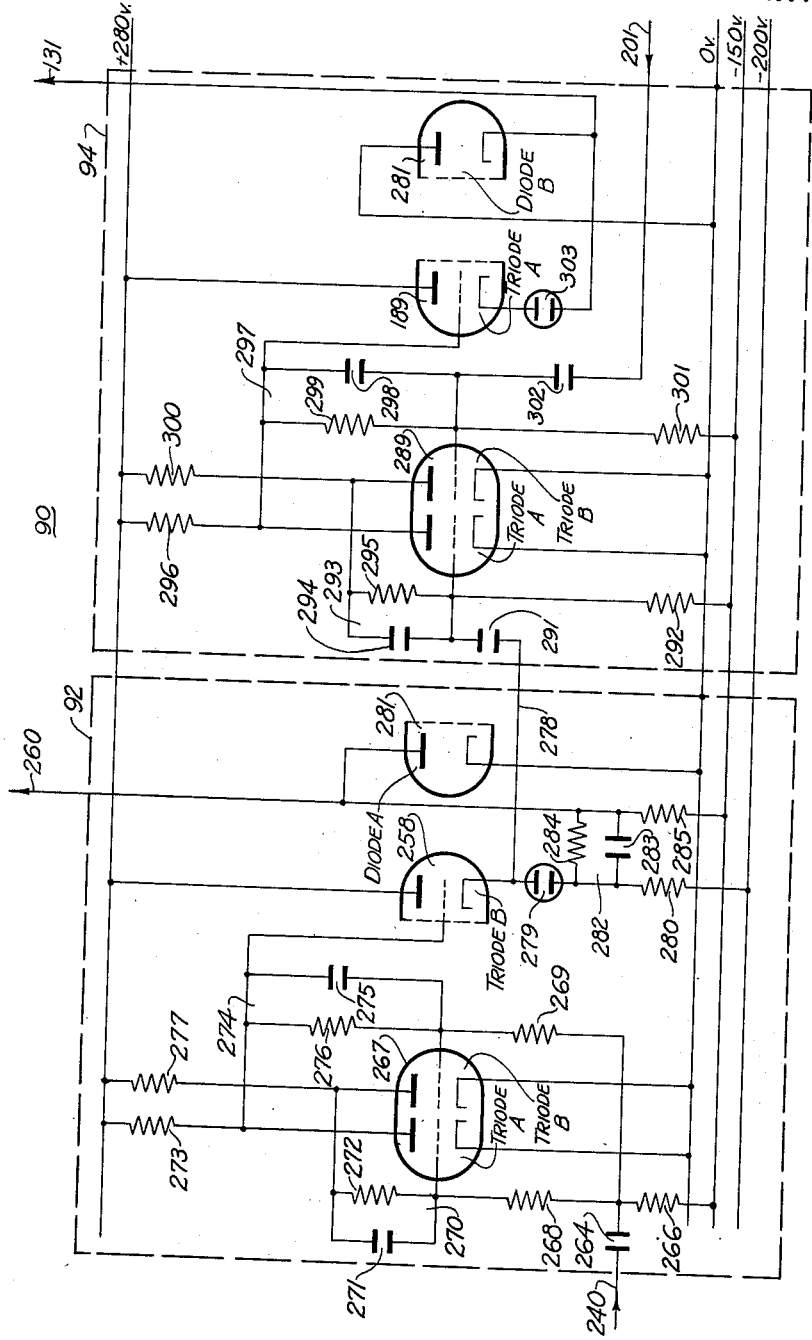
Fig. 7 is a schematic wiring diagram of the timer component comprising two trigger circuits.

In Fig. 7 the lead 240 furnishes a voltage of waveform 108 as shown on Fig. 3 and is connected to a coupling condenser 264 in the trigger circuit 92 of the timer 90. Said coupling condenser 264 is connected to the −150 volt direct current source through a dropping resistor 266, to the control grid of triode A of a double triode tube 267 through a grid biasing resistor 268, and to the control grid of triode B of said tube 267 through a grid biasing resistor 269. Further connections of triode A of said tube 267 are: the cathode is connected to ground; the control grid is connected to the plate of triode B of said tube 267 through a coupling network 270 comprising a condenser 271 connected in parallel with a resistor 272; the plate is connected to the +280 volt direct current source through a dropping resistor 273, to the control grid of triode B of said tube 267 through a coupling network 274 comprising a condenser 275 connected in parallel with a resistor 276, and to the control grid of triode B of the tube 258. Other connections of triode B of said tube 267 include a connection of the plate to the +280 volt direct current source through a dropping resistor 277 and a connection of the cathode to ground. Section B of said tube 258 is further connected as follows: the plate is connected to the +280 volt direct current source, the cathode is connected to a lead 278 and to a neon bulb 279. Said neon bulb 279 is connected to the —200 volt direct current source through a dropping resistor 280 and to the plate of diode A of a double diode tube 281 through a coupling network 282 comprising a condenser 283 connected in parallel with a resistor 284. The plate of diode A of said tube 281 is connected to the —150 volt direct current source through a dropping resistor 285 and to the lead 260 which supplies a voltage of waveform 109 as shown on Fig. 3 to other components of the polaroscope. The cathode of diode A of said tube 281 is connected to ground.

Said lead 278 is connected to the control grid of triode A of a double triode tube 289 of the trigger circuit 94 through a coupling condenser 291. Triode A of said tube 289 is connected as follows: The control grid is connected to the —150 volt direct current source through a dropping resistor 292 and to the plate of triode B of the same tube through a coupling network 293 comprising a condenser 294 connected in parallel with a resistor 295; the cathode is connected to ground; the plate is connected to the +280 volt direct current source through a dropping resistor 296, to the control grid of triode A of the double triode tube 189, and to the control grid of triode B of said tube 289 through a coupling network 297 comprising a condenser 298 connected in parallel with a resistor 299. Further connections of triode B of said tube 289 are: the plate is connected to the +280 volt direct current source through a dropping resistor 300; the cathode is connected to ground; and the control grid is connected to the —150 volt direct current source through a dropping resistor 301 and to the lead 201 which supplies a negative pulse of voltage during the first interval of operation through a coupling condenser 302. The plate of triode A of said tube 189 is connected to the +280 volt direct current source and the cathode is connected to a neon bulb 303 which is connected to the cathode of diode B of the tube 281 and to the lead 131. The plate of said diode B of the tube 281 is connected to ground.

The trigger circuit 92, of the timer 90 described above, is connected so that negative pulses are applied simultaneously to the control grid of triodes A and B of the double triode tube 267 and cause the tubes to conduct in an alternate manner. The input lead 240 supplies a voltage of waveform 108 as shown on Fig. 3 to the differentiator circuit comprising the condenser 264 and the resistor 266. Since a differentiator circuit operates to provide an output voltage which is proportional to the rate of change of the input voltage, the output voltage of said differentiator circuit is a negative pulse of voltage appearing at the end of the first and second intervals of operation. During the first interval triode A of the tube 267 is conducting and triode B of this same tube 267 is cut-off so that the triode B of the double triode tube 258 is cut-off and the leads 260 and 278 are both at a negative potential. As stated previously the output voltage of the differentiator comprises a negative pulse of voltage at the end of the first interval of operation and this voltage is applied simultaneously to the control grid of both triode A and triode B of said tube 267. This negative pulse of voltage at the control grid of triode B of said tube 267 has no effect as the control grid is already sufficiently negative to hold the tube at cut-off; however, the negative pulse of voltage at the control grid of triode A of this tube 267 starts a cumulative action which almost instantaneously causes triode A to cut-off and triode B to conduct heavily. Said cumulative action involves both triode A and triode B of said tube 267 and is as follows: the negative pulse of voltage at the control grid of triode A decreases the effective voltage and thereby causes the current flowing through said triode A to decrease; the decrease of current flowing through said triode A lowers the voltage drop across the plate dropping resistor 273 and thereby increases the plate voltage; since the plate of triode A is coupled to the control grid of triode B through the coupling network 274, the increase of plate voltage at triode A causes the voltage at the control grid of triode B to increase and therefore current begins to flow through said triode B; this current flow in said triode B produces a voltage drop through the plate dropping resistor 277 and thereby decreases the voltage at the plate of triode B; said decrease of voltage at the plate of triode B is coupled to the control grid of triode A by means of the coupling network 270 so that the voltage at the control grid of triode A is decreased still further; since the voltage at the control grid of triode A is decreased still further and is reflected to make more current flow through triode B, the triode A is soon cut-off and triode B is conducting heavily. The triode B of said tube 267 continues to conduct heavily and triode A of this same tube 267 remains cut-off during the second interval until the rate of change of the input voltage to the differentiator circuit is sufficient to cause a negative pulse of voltage to appear at the control grid of the two triodes. Since a negative pulse of voltage occurs at the end of the second interval when the input voltage of sawtooth waveform drops from maximum positive value to a small negative value almost instantaneously, the circuit is triggered, in a manner similar to the action described above, to the original state wherein triode A of the tube 267 is conducting and triode B of the same tube is cut-off. The output voltage of the trigger circuit is connected from the plate of triode A of the tube 267 to the control grid of triode B of the tube 258 so that said triode B of the tube 258 is cut-off during the first and third intervals of operation when the control grid is sufficiently negative with respect to the cathode to keep the tube cut-off. During the second interval said triode B of the tube 258 conducts since the potential on the control grid is raised above the cut-off value. Thus, since the voltage at the cathode of triode B of the tube 258 varies in phase with the voltage at the control grid, the voltage at said cathode is negative during the first and third intervals while said tube is cut-off and approaches a positive value in the second interval. Said resulting rectangular wave of voltage is transmitted by the lead 278 to the trigger circuit 94 of the timer 90 and is connected to the lead 260 through a low impedance coupling network 282. The voltage of the lead 260 is by-passed to ground potential during the second interval by the action of diode A of the double diode tube 281 since the plate is connected to said lead 260 and the cathode is connected to ground, and since the tube 281 conducts when the plate becomes more positive than the cathode. Said lead 260 supplies a voltage of the waveform 109 as shown on Fig. 3 to other components of the polaroscope.

The lead 278 transmits the voltage at the cathode of triode B of the tube 258 in the trigger circuit 92 to the control grid of triode A of the tube 289 in the trigger circuit 94 through a differentiator circuit comprising the condenser 291 and the resistor 292 so that this control grid receives a positive pulse of voltage at the beginning of the second interval and a negative pulse of voltage at the end of the second interval. Triode A and triode B of the tube 289 are interconnected as a trigger circuit so that the flow of current in the tube sections can be controlled. The control grid of triode B of said tube 289 receives a negative pulse of voltage at the end of the third interval from the impulse generator by means of the lead 201. In the first and second intervals of operation triode A of said tube 289 is conducting heavily while triode B of this same tube is cut-off. The action of this trigger circuit 94 is as follows: at the start of the second interval a positive pulse of voltage is impressed on the control grid of triode A, but has no effect on the tube operation as it is conducting at this time; a negative pulse impressed on the control grid of triode A at the start of the third interval causes the current flow through the tube to decrease, which decreases the potential across the plate dropping resistor 296, and thus increases the plate voltage; since the plate of triode A is connected to the control grid of triode B through the coupling network 297, the increase of plate voltage at triode A is applied to the control grid of triode B, thus raising the potential of the control grid and causing current to flow through this section of the tube 289; the flow of current through triode B increases the voltage drop across the plate dropping resistor 300, thereby decreasing the plate voltage of triode B; the decrease of plate voltage at triode B is transmitted to the control grid of triode A through the coupling network 293, thus decreasing the potential of this control grid; since voltage changes in the tube elements are transmitted from triode A to triode B and vice versa, and since the voltage changes transmitted are cumulative at the tube elements, triode A is almost instantaneously cut-off and triode B is conducting heavily. The trigger circuit remains in this state of operation until the end of the third interval when a negative pulse of voltage is impressed on the control grid of triode B of the tube 289 and the trigger circuit operates again in a manner similar to that described above so that triode A is conducting and triode B is cut-off. The voltage at the plate of triode A of the tube 289 is connected to the control grid of triode A of the double triode tube 189 so that the operation of this tube follows the plate voltage of triode A of said tube 289. Thus the output voltage of the trigger circuit 94 as taken from the cathode of triode A of the tube 189 by the lead 131 has the rectangular wave-shape 106 as shown on Fig. 3. Any negative voltage components in the output voltage are grounded by the clamping diode B of the double diode tube 281 as the cathode is connected to the lead 131 and the plate is connected to ground so that the tube conducts any time the cathode becomes negative with respect to the plate.

Figure 8:
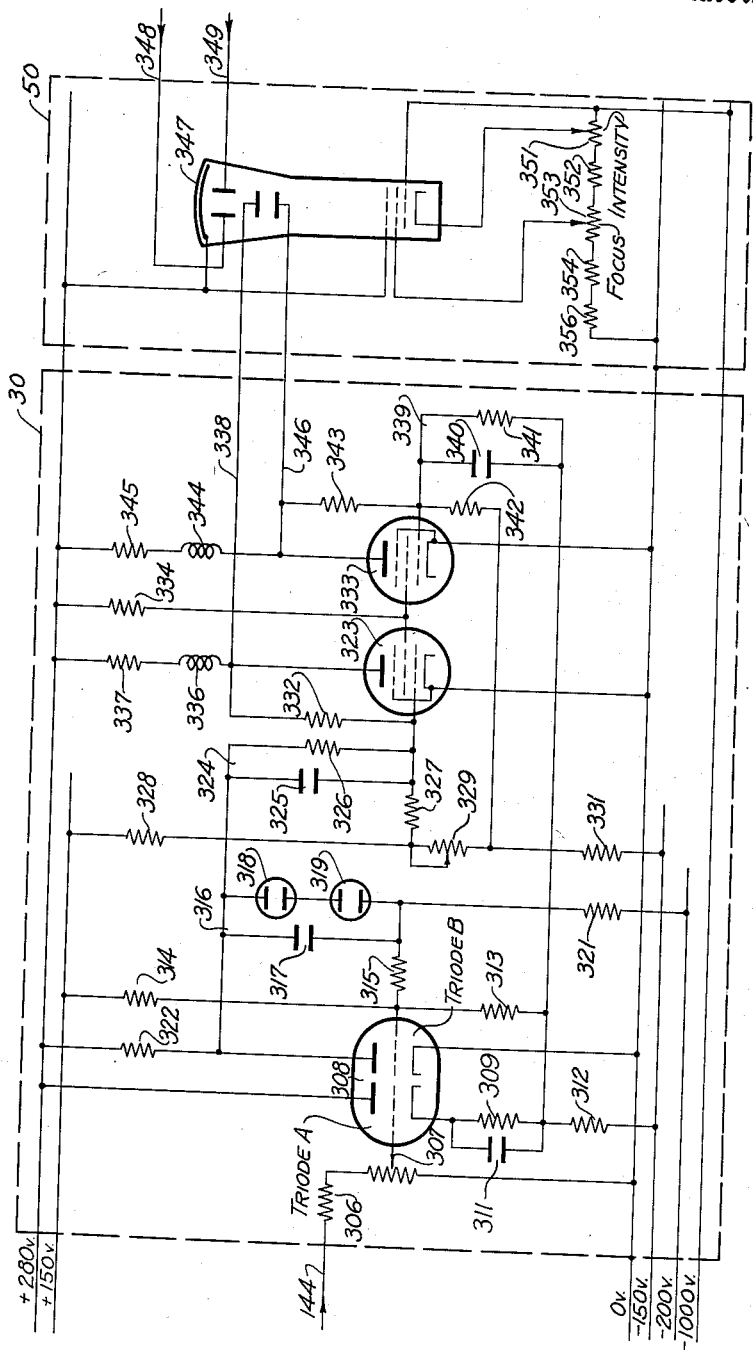
Fig. 8 is a schematic wiring diagram of the balanced amplifier component and the cathode ray tube component.

In Fig. 8, lead 144 supplies a voltage of waveform 103 as shown on Fig. 3 to a voltage divider comprising a resistor 306 and a potentiometer 307 which is connected to ground. Said potentiometer is connected to the control grid of triode A of a double triode tube 308 by means of its adjustable element. Other connections of said triode A of tube 308 are: the plate is connected to the +280 volt direct current source; and the cathode is connected to a biasing resistor 309 in parallel with a by-pass condenser 311, which is connected to the −150 volt direct current source through a dropping resistor 312, and to the control grid of triode B of said tube 308 through a a biasing resistor 313. Further connections of triode B of said tube 308 are as follows: the cathode is connected to ground; the control grid is connected to the +150 volt direct current source through a dropping resistor 314, and to a resistor 315 which is connected to the plate through a coupling network 316 comprising a condenser 317 in parallel with two neon bulbs 318 and 319 and further to the −200 volt direct current source through a dropping resistor 321; and the plate is further connected to the +280 volt direct current supply through a dropping resistor 322, and to the control grid of a pentode tube 323 through a coupling network 324 comprising a condenser 325 in parallel with a resistor 326. Said pentode tube 323 is further connected as follows: the control grid is connected, through a resistor 327, to a resistance voltage divider between the +150 volt and −150 volt direct current sources comprising a resistor 328, a potentiometer 329, and a resistor 331, and to the plate through a resistor 332; the cathode is connected to ground; the screen grid is connected to the screen grid of another pentode tube 333 and to the +280 volt direct current source through a dropping resistor 334; the plate is connected to the +280 volt direct current source through a compensating inductor 336 and a dropping resistor 337, and to a lead 338. Said tube 333 is connected in the following manner: the cathode is connected to ground; the control grid is connected to a point between resistors 311 and 312 in the cathode circuit of triode A of said tube 308 through a coupling network 339 comprising a condenser 340 in parallel with a resistor 341, to a point between the potentiometer 329 and the resistor 331 of the voltage divider through a resistor 342, and to the plate of this tube through a resistor 343; the plate is connected to the +280 volt direct current source through a compensating inductor 344 and a dropping resistor 345, and to a lead 346.

Said leads 338 and 346 are connected to the vertical deflection plates of a cathode ray tube 347 in the cathode ray tube circuit 50 and supply a voltage of waveform 103 as shown on Fig. 3. The horizontal deflection plates of said cathode ray tube 347 are supplied a voltage of waveform 110 as shown on Fig. 3 by leads 348 and 349. Voltages for the cathode ray tube 347 elements are supplied by a resistance voltage divider connected between the −1000 volt direct current source and ground comprising a potentiometer 351, and a resistor 352, a potentiometer 353, and two resistors 354 and 356. The cathode of said cathode ray tube 347 is connected to the adjustable arm of said potentiometer 351 which serves as the intensity control; the control grid is connected to the −1000 volt direct current supply; the first accelerating anode is connected to the adjustable arm of said potentiometer 353 which serves as the focusing control; the second accelerating anode and the screen anode are connected to the +280 volt direct current source.

The input voltage of the balanced amplifier 30 circuit described above is transmitted from the output of the negative feedback amplifier 10 by the lead 144 and has the wave form 103 as shown on Fig. 3. Said input voltage is impressed on the control grid of triode A of the double triode tube 308, which is connected in the form of a cathode follower, across the resistor 306 and the potentiometer 307. Said potentiometer 307 may be adjusted as the "Y" gain control and determines the vertical spread of the polarogram on the screen of the cathode ray tube 347. The voltage developed across the biasing resistor 312 in the cathode circuit of triode A of the tube 308 is impressed on the control grid of triode B of this same tube 308 and on the control grid of a pentode amplifier tube 333. Triode B of said tube 308 is connected into the circuit to invert the voltage applied at the control grid before the voltage is amplified by the pentode amplifier tube 323. Said pentode tubes 323 and 333 are connected as conventional wide band amplifiers and furnish voltages by means of the leads 338 and 346 of like waveform 103, but of opposite phase relationship, to the vertical deflecting plates for push-pull voltage operation of the cathode ray tube 347. The normal control grid bias of the two amplifier tubes 323 and 333 is supplied by a resistance voltage divider comprising the resistor 328, the potentiometer 329 and the resistor 331. Said potentiometer 329 may be adjusted to vary the control grid bias and thereby shift the polarogram along the vertical axis of the cathode ray tube 347 screen and is known as the "Y" position control. The value of the voltage necessary to shift the polarogram is small and does not appreciably affect the gain of the two amplifiers.

In the cathode ray tube circuit 50, said leads 338 and 346 furnish a voltage proportional to the current flowing in the dropping mercury cell 20 to the vertical deflecting plates. The leads 348 and 349 furnish a voltage proportional to the voltage applied across said dropping mercury cell 20 as will be described hereinafter. Thus, with these voltages applied to the deflecting plates of the cathode ray tube 347, a trace showing the current-voltage relationship of the dropping mercury cell 20 is visually portrayed on the screen of said cathode ray tube 347. The intensity of the electron beam may be adjusted by varying the potential applied at the cathode of the cathode ray tube; that is, by varying the position of the adjustable element of the potentiometer 351. The focus of the electron beam on the screen of said cathode ray tube may be adjusted by changing the position of the variable element of the potentiometer 353.

Figure 9:
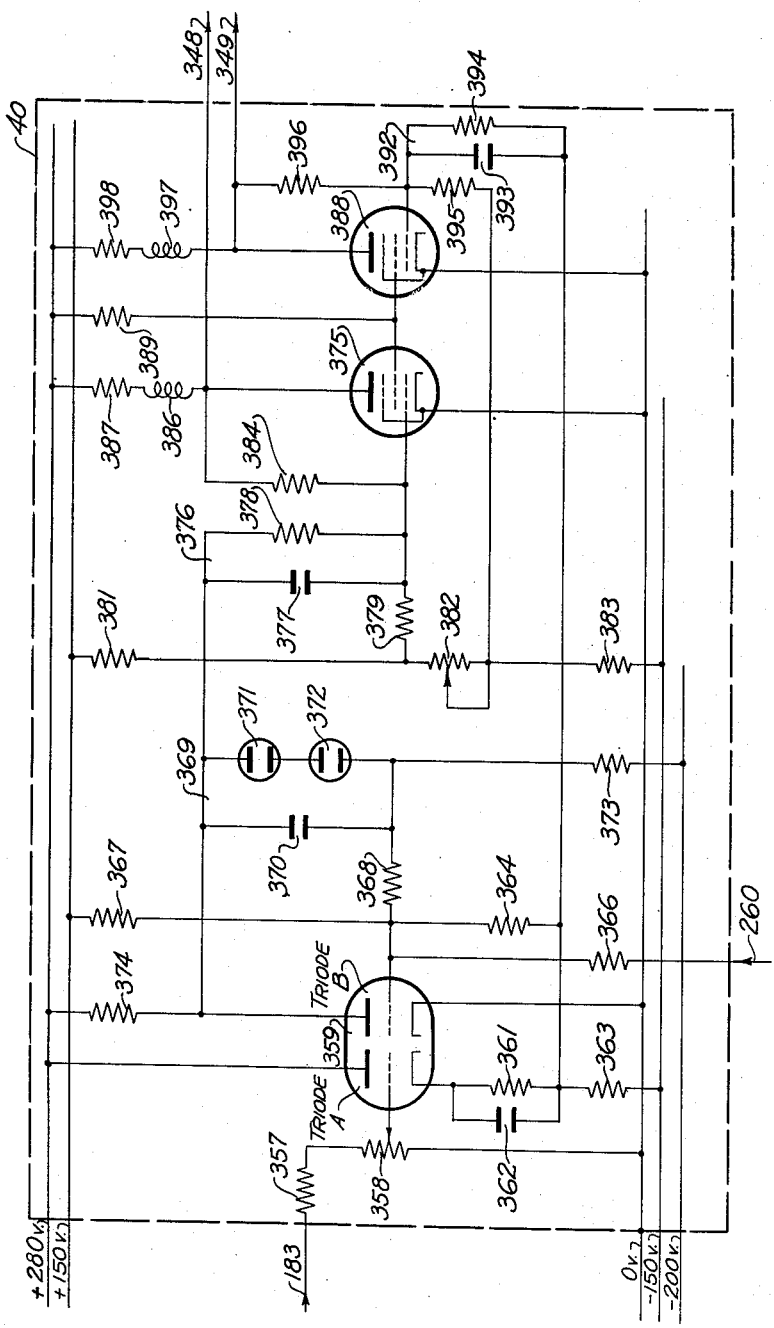
Fig. 9 is a schematic wiring diagram of the reproducing amplifier component of the polaroscope.

In Fig. 9, the lead 183 furnishes a voltage of sawtooth waveform 110 as shown on Fig. 3 across a voltage divider comprising a resistor 357 and a potentiometer 358. The adjustable arm of said potentiometer 358 is connected to the control grid of triode A of a double triode tube 359. Other connections to triode A of said tube 359 are as follows: the plate is connected to the +280 volt direct current source; and the cathode is connected to a biasing resistor 361 in parallel with a by-pass condenser 362 which is connected to the −150 volt direct current source through a dropping resistor 363, and to the control grid of triode B of said tube 359 through a biasing resistor 364. The remaining elements of triode B of said tube 359 are connected as follows: the cathode is connected to ground; the control grid is connected to the lead 260, through a dropping resistor 366, which supplies a voltage of waveform 109 as shown on Fig. 3, to the +150 volt direct current source through a dropping resistor 367, and to a resistor 368, which is connected to the plate through a coupling network 369 comprising a condenser 370 in parallel with two neon bulbs 371 and 372 and further to the −200 volt direct current source through a dropping resistor 373; and the plate is further connected to the +280 volt direct current source through a dropping resistor 374 and to the control grid of a pentode tube 375 through a coupling network 376 comprising a condenser 377 in parallel with a resistor 378. Said pentode tube 375 is further connected in the following manner: the cathode is connected to ground; the control grid is connected, through a resistor 379, to a resistance voltage divider between the +150 volt and −150 volt direct current sources comprising a resistor 381, a potentiometer 382, and a resistor 383, and to the plate through a resistor 384; the plate is connected to the +280 volt direct current source through a compensating inductor 386 and a dropping resistor 387 and to the lead 348; and the screen grid is connected to the screen grid of a pentode tube 388 and to the +280 volt direct current source through a dropping resistor 389. Other connections of said pentode tube 388 are: the cathode is connected to ground; the control grid is connected to a point between said resistors 361 and 363 in the cathode circuit of triode A of said tube 359 through a coupling network 392 comprising a condenser 393 in parallel with a resistor 394, to a point between the potentiometer 382 and a resistor 383 of the voltage divider through a resistor 395, and to the plate through a resistor 396; the plate is connected to the +280 volt direct current supply through a compensating inductor 397 and a dropping resistor 398 and to a lead 349.

The reproducing amplifier 40 described in the preceding paragraph is supplied by the lead 183 with a voltage of sawtooth waveform 110 as shown on Fig. 3. Said lead 183 impresses said voltage of sawtooth waveform across a resistance voltage divider comprising the resistor 357 and the potentiometer 358. Said potentiometer may be adjusted as the "X" gain and determines the horizontal spread of the polarogram on the screen of the cathode ray tube 347. This reproducing amplifier 40 operates in a manner similar to the balanced amplifier 30 described above in that the adjustable element of the potentiometer 358 supplies the input voltage of sawtooth waveform to a cathode follower stage comprising the triode A of the double triode tube 359 and the voltage across the cathode resistor 363 of said cathode follower stage is amplified through two parallel channels of conventional wide band amplifier stages comprising pentode tubes 375 and 388 in opposite phase relation. The phase inversion is accomplished in one of the channels through triode B of said tube 359. The plate voltage of the two amplifier stages is connected to the horizontal deflecting plates of the cathode ray tube 347 by the two leads 348 and 349. The normal control grid bias of the two amplifier stages is supplied by a resistance voltage divider comprising the resistor 381, the potentiometer 382 and the resistor 383. Said potentiometer 382 may be adjusted to vary the control grid bias and thereby shift the polarogram along the horizontal axis of the cathode ray tube 347 screen and is known as the "X" position control. The value of the voltage necessary to shift the polarogram is small and does not appreciably affect the gain of the two amplifiers. A voltage of rectangular waveform 109 as shown on Fig. 3 is applied to the control grid of triode B of the tube 359 so that during the first and third intervals of operation this control grid bias voltage is sufficient to keep the tube cut-off and only signal voltages impressed during the second interval will be reproduced through the tube. This action during the first and third intervals causes the beam of the cathode ray tube 347 to be deflected off the screen of the cathode ray tube 347 so that there is no visible trace on the screen of the cathode ray tube 347. During the second interval when the voltage of sawtooth waveform is applied across the dropping mercury cell 20, the voltage applied by the lead 260 to the control grid of triode B of the tube 359 is zero and signal voltages are thus reproduced through this tube to the cathode ray tube and the trace is visible on the screen.

The connections and operations of the components of the polaroscope have been described individually. Now, the starting operation of the polaroscope as a unit will be disclosed.

The operation of the polaroscope may be initiated by one of several procedures, however, the polaroscope is normally started by turning on the power supply 100, and then, when said power supply 100 has reached a steady state of operation, the dropping mercury cell 20 is connected to the negative feedback amplifier circuit 10 as shown on Fig. 4. The values of the circuit elements in the timer 90 are such that the output voltage of the trigger circuit 92 is negative and the output voltage of the trigger circuit 94 is positive, as soon as the operation of the polaroscope is initiated. Since the output voltage of said trigger circuit 92 is negative and is connected by the lead 260 to several components of the circuit, the control grid of triode B of the tube 359 in the reproducing amplifier 40 becomes negative to deflect the electron beam of the cathode ray tube 347 off the screen, the cathode of triode A of the double triode tube 258 becomes negative to block any signal from reaching the output of the output circuit 84 of the voltage generator 80. Also, since the output voltage of said trigger circuit 94 is positive and is connected by the lead 131 to several components of the circuit, the control grid of the pentode tube 112 in the negative feedback amplifier 10 is positive to impress a positive voltage across the dropping mercury cell 20, the plate of the tube 172 in the drop detector 74 circuit is positive to allow signal voltages at the control grid to be reflected to the impulse generator 76, and the control grid of triode A of the tube 223 in the voltage generator 80 is positive to block any negative pulses of voltage received from the plate of the tube 219.

With the above conditions existing, the first mercury drop falling from the tip of the capillary electrode 167 causes the resistance of the dropping mercury cell 20 to increase sharply, thereby decreasing the amount of current flowing through said cell 20, and reflecting to the output of the negative feedback amplifier 10 an instantaneous voltage decrease. Since the voltage output of said negative feedback amplifier 10 is connected, by means of the lead 144, to the derivator 72 of the initiator 70, a negative pulse of voltage is formed at the output of said derivator 72 in response to said instantaneous voltage decrease, and thusly, at the time the first mercury drop falls from the tip of the capillary electrode 167. Said negative pulse of voltage is coupled from the derivator 72 to the drop detector 74 by the lead 171; thus, since said drop detector 74 is sensitive, a positive pulse of voltage appears at the plate of the pentode tube 172. The lead 176 applies said positive pulse of voltage at the plate of said pentode tube 172 in said drop detector 74 to the impulse generator 76 which furnishes a negative pulse of voltage of a standard value to the trigger circuit 94 of the timer 90, by means of the lead 201, and to the dropping rate meter 78 by means of the lead 204. Said negative pulse of voltage impressed by said lead 201 on the trigger circuit 94 trips the operation of this circuit so that the output of voltage drops instantaneously from a positive value of voltage to zero. With the voltage output of said trigger circuit 94 at zero value, the voltage across the dropping mercury cell 20 is zero and any further mercury drops falling from the dropping mercury electrode 167 will have no effect on the circuit operation; also, since the voltage applied to the control grid of the tube 223 in the voltage generator 80 becomes zero, the sawtooth wave generator 82 becomes sensitive for the generation of voltages.

As stated above, said impulse generator 76 furnishes a negative pulse of voltage to the dropping rate meter 78. Since said dropping rate meter 78 is connected to average the input pulses of voltage, the output voltage is proportional to the rate at which the input pulses of voltage occur, thus, the ouput voltage is proportional to the dropping rate of the mercury drops. Obviously, the output voltage of said dropping rate meter 78 will not be proportional to the adjusted dropping rate of the dropping mercury cell 20 and will not reach a steady value until ten to fifteen drops have formed and fallen from the tip of the capillary electrode 167.

The voltage output of said dropping rate meter 78 is applied to the sawtooth wave generator 82 of the voltage generator 80 and charges the condenser 241 until the voltage across said condenser 241 reaches the conduction voltage of the thyratron tube 232. When the voltage charge of said condenser 241 reaches the conduction voltage of said thyratron tube 232, this tube fires, and in so doing discharges the condenser 241 very rapidly, thus forming a voltage wave across said condenser 241 which rises from zero to a maximum value over a period of time and then returns to zero in an extremely short time, in other words, a sawtooth wave of voltage. The output voltage of said sawtooth wave generator is transmitted to the trigger circuit 92 of the timer 90 and to the output circuit 84 of said voltage generator 80 by the lead 240. At the time said saw-tooth wave of voltage changes from maximum positive value to zero, a negative pulse of voltage is impressed on the control grids of the double triode tube 267, and the trigger circuit 92 is tripped so that its output voltage rises from a negative value to zero. Since the output voltage of said trigger circuit 92 is connected to the cathode of the tube 258 in the output circuit 84 and to the control grid of triode B of the tube 359 in the reproducing amplifier 40, said output circuit becomes sensitive to pass voltages from the sawtooth wave generator 82 and the electron beam of the cathode ray tube 347 is returned to the screen to trace the current-voltage relation of the electrolyte in the dropping mercury cell 20.

Thus, it is seen that the circuit is now ready to complete the cycle of operation and provide a visual trace of the current-voltage relation of the electrolyte being tested in the dropping mercury cell 20. This final operation occurs when the condenser 241 in the sawtooth wave generator 82 charges for the second time at a rate proportional to the rate at which mercury drops fall in the dropping mercury cell 20 and discharges when the conduction voltage of the thyratron tube 232 is reached, that is, when a second voltage of sawtooth waveform is produced by the sawtooth wave generator 82. Said second voltage of sawtooth waveform is transmitted from the sawtooth wave generator 82 to the trigger circuit 92 by the lead 240 and to the output circuit 84 by the same lead. Said output circuit 84 reproduces and transmits said second voltage of sawtooth waveform by the lead 183 to a resistance voltage divider in the drop detector 74 and to the input circuit of the reproducing amplifier 40. The value of the second voltage of sawtooth waveform impressed across the dropping mercury cell 20, through the negative feedback amplifier by means of the lead 116, is controllable by the potentiometer 181, which is part of said resistance voltage divider in said drop detector 74. Thus, the second voltage of sawtooth waveform with the desired magnitude is impressed across the electrolyte solution in the dropping mercury cell 20 and voltage changes at the output of the negative feedback amplifier 10, in response to current changes in said cell 20, are transmitted to the balanced amplifier 30.

The voltage of sawtooth waveform applied to the reproducing amplifier 40 is the same as that applied to the dropping mercury cell 20 and is amplified through two channels of amplification, one of which is opposite in phase to the other, and the resultant voltages are then impressed on the horizontal deflecting plates of the cathode ray tube 347 for push-pull operation. The input voltage of the balanced amplifier 30 which is proportional to the current flowing through the electrolyte of the dropping mercury cell 20 is amplified in a similar manner as in the reproducing amplifier 40 and is then impressed on the vertical deflecting plates of the cathode ray tube 347 for push-pull operation. With these voltages applied to the deflecting plates of the cathode ray tube 347, the electron beam traces the current-voltage characteristic of the electrolyte under analysis. However, as has been pointed out previously the voltage output of the dropping rate meter 78 does not reach maximum value until ten or fifteen drops have fallen, so that traces appearing on the screen of the cathode ray tube 347 will not be accurate until this number of drops have fallen.

At the termination of the second voltage of sawtooth waveform as impressed on the trigger circuit 92 of the timer 90, a negative pulse occurs to trip this circuit and the output voltage decreases from zero to a negative value. Since the output voltage of said trigger circuit 92 is connected to the input of the trigger circuit 94 of the timer 90, a negative pulse occurs when said trigger circuit 92 trips and causes the output voltage of said trigger circuit 94 to change from zero to a positive value. Thus, the voltage have returned to the conditions existing prior to the time the first mercury drop fell from the tip of the capillary electrode 167 of the dropping mercury cell 20 and the circuit is operative to repeat the cycle as soon as another mercury drop falls.

Consider now a cycle of operation after ten or fifteen mercury drops have fallen and beginning at an instant shortly before another mercury drop falls from the tip of the capillary tube 167 of the dropping mercury cell 20, that is, an instant prior to the end of the third interval of a normal cycle of operation as defined earlier in this disclosure.

At this moment the output voltage of the trigger circuit 92 is negative and the output voltage of the trigger circuit 94 is positive. Since these output voltages exist, the drop detector 74 is operative, the voltage generator 80 is inoperative, a small positive voltage is present across the dropping mercury cell 20 and at the output of the negative feedback amplifier 10, and the electron beam is deflected off the screen of the cathode ray tube 347. As the drop continues to enlarge, the resistance of the dropping mercury cell 20 gradually decreases and the voltage appearing at the output of the negative feedback amplifier 10 increases slowly.

When the drop breaks from the tip of the capillary tube 167, the resistance of the dropping mercury cell 20 suddenly increases so that the voltage appearing at the output of the negative feedback amplifier 10 and at the input of the derivator 72 in the initiator 70 suddenly decreases, causing a positive pulse of voltage to be impressed on the drop detector 74. Since at this time the drop detector 74 is sensitive by virtue of the positive potential impressed on the plate of the pentode tube 172 by the timer 90, a negative pulse of voltage is produced at the output of said drop detector 74, and this negative pulse of voltage is applied to the impulse generator 76. The corresponding standard pulse of voltage produced by the impulse generator 76 is applied to the timer 90 to trip the trigger circuit 94, causing the output voltage of this trigger circuit 94 to change from a positive value to zero, thereby ending the third interval and starting the first interval of operation.

The change of the output voltage of the trigger circuit 94 to zero value renders the sawtooth wave generator 82 of the voltage generator 80 operative to produce sawtooth waves of voltage, reduces the output voltage of the negative feedback amplifier 10 to zero, and renders the drop detector 74 insensitive to changes of voltage at its input. As soon as the sawtooth wave generator is made operative, the condenser 241 charges at a rate proportional to the rate at which pulses of voltage appear at the output of the impulse generator 76 and thus at the input of the dropping rate meter 78. Said condenser 241 charges in a linear manner until the conduction voltage of the thyratron tube 232 is reached, at which voltage said tube conducts and rapidly discharges said condenser 241, so that a voltage of sawtooth waveform is developed. This voltage of sawtooth waveform is applied to the output circuit 84, which at this moment is inoperative for transferring any voltage to the input of the negative feedback amplifier 10 by virtue of the fact that the output voltage of the trigger circuit 92 is still negative.

When the thyratron tube 232 conducts, discharging the condenser 241, the first interval ends and the second interval is initiated. The decrease of voltage resulting from the discharge of the condenser 241 causes a negative pulse to be applied to the trigger circuit 92, thus tripping this circuit so that the output voltage increases from a negative value to zero. This change in the output voltage of the trigger circuit 92 renders the output circuit 84 operative to transmit a second voltage of sawtooth waveform to the negative feedback amplifier 10 and at the same time returns the electron beam to the screen of the cathode ray tube 347. During the generation of the second voltage of sawtooth waveform by the voltage generator, this second voltage of sawtooth waveform is applied to the input of the negative feedback amplifier 10 and thus across the dropping mercury cell 20. As the current in the dropping mercury cell 20 varies in a manner dependent upon the nature and amounts of reducible components in the electrolyte, the voltage across the selected feedback resistance varies proportionately and is reflected to the output of the negative feedback amplifier 10. Since the output voltage of the negative feedback amplifier 10 is impressed on the balanced amplifier 30, the voltage output of this balanced amplifier is proportional to the current flowing through the dropping mercury cell 20 and is impressed on the vertical deflecting plates of the cathode ray tube 347. Simultaneously the voltage of sawtooth waveform is applied to the reproducing amplifier 40, and thus, the voltage output of said reproducing amplifier 40 as impressed on the horizontal deflecting plates of the cathode ray tube 347 is proportional to the voltage applied across the dropping mercury cell 20. Accordingly, a trace is produced on the screen of the cathode ray tube 347 that represents the current-voltage relationship of the electrolyte in the dropping mercury cell 20. As the output voltage of the negative feedback amplifier 10 varies in accordance with the current in the dropping mercury cell 20, fluctuations of voltage are produced at the input of the drop detector 74; however, these fluctuations of voltage have no effect on the impulse generator 76, because at this time said drop detector 74 is inoperative.

When the thyratron tube 232 conducts and discharges the condenser 241 for the second time, the second interval ends and the third interval is initiated. A negative pulse of voltage occurs at the input of the trigger circuit 92 in response to the discharge of the condenser 241, thus, said trigger circuit 92 is tripped so that its output voltage decreases from zero to a negative value, which, in turn, causes a negative pulse of voltage to trip the trigger circuit 94 and its output voltage increases from zero to a positive value. Since the output voltage of the trigger circuits 92 and 94 have now returned to the values present at the start of the cyclic operation, the same conditions exist throughout the circuit, so that another cycle of operation will occur when a mercury drop falls from the tip of the capillary electrode 167.

While I have described the salient features of this invention in detail with respect to one embodiment it will, of course, be apparent that numerous modifications may be made within the spirit and scope of this invention and I do not therefore desire to limit the invention to the exact details shown except insofar as they may be defined in the following claims.

What is claimed is:

1. In combination, an electrolytic cell having means for forming an electrode surface within a liquid; a voltage generator for generating a voltage wave that varies instantaneously as a predetermined function of time elapsed from the instant operation is initiated comprising an amplifier having an input and an output, a coupling element between two stages of said amplifier including a parallel connected condenser and gaseous discharge tube, means connected between said output and input for supplying negative feedback; an initiator adapted to generate a voltage wave that is proportional to the rate at which said electrode surfaces are formed within said electrolytic cell; a timer to control the time at which said proportional voltage is applied to charge said condenser and the time at which the voltage generated by said voltage generator is impressed across said electrode surface; and an indicator to show current variations at said electrode surface as a function of the voltage generated by said voltage generator.

2. In combination, an electrolytic cell having an electrode formed by a body of fluid having a limited portion thereof in contact with a second fluid, said limited portion of the electrode surface being periodically renewed in a substantially uniform manner; a voltage generator adapted upon operation to generate a voltage wave that varies instantaneously as a predetermined function of time elapsed from the instant operation thereof is initiated; an initiator comprising a derivator for developing pulses of voltage in response to current changes through said cell, a detector connected to said derivator for eliminating voltages other than that occurring in response to the renewal of said electrode surface, a metering circuit connected to said detector for integrating the output voltage thereof, whereby a voltage is developed proportional to the rate at which said electrode surfaces are renewed; a timer to control the time at which said proportional voltage is applied to said voltage generator and the time at which said generated voltage is impressed across said electrode surface; and an indicator to show current variations at said electrode surface as a function of the voltage generated by said voltage generator.

References Cited in the file of this patent

UNITED STATES PATENTS

| Number | Name | Date |
|---|---|---|
| 2,246,981 | Matheson et al. | June 24, 1941 |
| 2,267,551 | Cherry | Dec. 23, 1941 |
| 2,282,605 | Lindsay | May 12, 1942 |
| 2,343,885 | Coleman | Mar. 14, 1944 |
| 2,390,608 | Miller et al. | Dec. 11, 1945 |
| 2,408,078 | Labin et al. | Sept. 24, 1946 |
| 2,435,958 | Dean | Feb. 17, 1948 |
| 2,438,910 | Grieg | Apr. 6, 1948 |